US009582946B2

(12) United States Patent
Kim

(10) Patent No.: US 9,582,946 B2
(45) Date of Patent: Feb. 28, 2017

(54) METHOD FOR MANAGING BREAKDOWN OF CONSTRUCTION EQUIPMENT FOR PROVIDING CURRENT WORKABLE INFORMATION

(71) Applicant: DOOSAN INFRACORE CO., LTD., Incheon (KR)

(72) Inventor: Ji Hoon Kim, Gyeonggi-do (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 14/374,810

(22) PCT Filed: Jan. 23, 2013

(86) PCT No.: PCT/KR2013/000531
§ 371 (c)(1),
(2) Date: Mar. 10, 2015

(87) PCT Pub. No.: WO2013/115517
PCT Pub. Date: Aug. 8, 2013

(65) Prior Publication Data
US 2015/0221143 A1 Aug. 6, 2015

(30) Foreign Application Priority Data

Jan. 30, 2012 (KR) .................. 10-2012-0008721

(51) Int. Cl.
*G07C 5/08* (2006.01)
*G07C 5/00* (2006.01)
(Continued)

(52) U.S. Cl.
CPC ........... *G07C 5/0808* (2013.01); *G06Q 10/20* (2013.01); *G06Q 50/08* (2013.01); *G07C 5/006* (2013.01); *G07C 5/008* (2013.01); *G07C 5/0816* (2013.01)

(58) Field of Classification Search
CPC ...... G07C 5/0808; G07C 5/008; G07C 5/006; G06Q 10/20; G06Q 50/08
(Continued)

(56) References Cited

U.S. PATENT DOCUMENTS

2004/0085198 A1* 5/2004 Saito .................. B60G 17/0185
340/438
2004/0199831 A1 10/2004 Shibata et al.
(Continued)

FOREIGN PATENT DOCUMENTS

CN 1552008 12/2004
CN 1940794 4/2007
(Continued)

OTHER PUBLICATIONS

Search Report dated Apr. 30, 2013 and written in Korean with English translation for International Patent Application No. PCT/KR2013/000531 filed Jan. 23, 2012, 5 pages.
(Continued)

*Primary Examiner* — Anne M Antonucci
(74) *Attorney, Agent, or Firm* — Hauptman Ham, LLP

(57) ABSTRACT

A method of managing a breakdown of construction equipment according to the present disclosure includes: requesting, by a diagnosis device of the construction equipment, state information from a plurality of vehicle control devices; confirming, by the diagnosis device, the state information received from the plurality of vehicle control devices; transmitting, by the diagnosis device, breakdown information to a peripheral communication terminal or a control server when the plurality of vehicle control devices has a problem according to the state information; receiving, by the diagnosis device, a breakdown part and a current workable range of the construction equipment from the communication terminal or the control server; and displaying the breakdown
(Continued)

part and the current workable range of the construction equipment on a gauge panel.

3 Claims, 4 Drawing Sheets

(51) Int. Cl.
    *G06Q 50/08*     (2012.01)
    *G06Q 10/00*     (2012.01)

(58) Field of Classification Search
    USPC .......................................................... 701/537
    See application file for complete search history.

(56) References Cited

U.S. PATENT DOCUMENTS

| | | | |
|---|---|---|---|
| 2007/0073457 A1* | 3/2007 | Lee ........................ | B60R 16/023 |
| | | | 701/50 |
| 2008/0074247 A1* | 3/2008 | Plantamura ....... | B60W 50/0205 |
| | | | 340/438 |

FOREIGN PATENT DOCUMENTS

| | | |
|---|---|---|
| JP | 2000-336701 | 12/2000 |
| JP | 2002-023134 | 1/2002 |
| KR | 10-0813556 | 3/2003 |
| KR | 10-2006-0038913 | 5/2006 |
| KR | 10-0652876 | 12/2006 |

OTHER PUBLICATIONS

Chinese Office Action dated Jun. 27, 2016 for Chinese Application No. 201380007213.0, 7 pages.

* cited by examiner

METHOD FOR MANAGING BREAKDOWN OF CONSTRUCTION EQUIPMENT FOR PROVIDING CURRENT WORKABLE INFORMATION

CROSS-REFERENCE TO RELATED APPLICATION

This Application is a Section 371 National Stage Application of International Application No. PCT/KR2013/000531, filed Jan. 23, 2013 and published, not in English, as WO 2013/115517 on Aug. 8, 2013.

FIELD OF THE DISCLOSURE

The present disclosure relates to a breakdown management method of construction equipment, and more particularly, to a breakdown management method of construction equipment, which analyzes breakdown information when a problem is generated in construction equipment, and notifies current workable information, as well as a breakdown part of the construction equipment.

BACKGROUND OF THE DISCLOSURE

In general, in a remote management system of construction equipment, construction equipment, such as an excavator and a wheel loader, includes a communication module connected with a vehicle control device, and transmits information on the construction equipment to a control server through a mobile communication network or a satellite communication network, and the control server stores and manages the information on the construction equipment.

In the meantime, installation of the communication module in the construction equipment incurs cost, and the transmission of the information on the construction equipment to the control server incurs additional data transmission cost, so that a method of transmitting information on the construction equipment to peripheral communication terminals has been developed.

In either the method of transmitting the information on the construction equipment to the control server or the method of transmitting the information on the construction equipment to the peripheral communication terminal, when a problem is generated in the construction equipment, an operator or an equipment manager is aware of only a fact that a breakdown is generated through a gauge panel of the construction equipment or the information received from the communication terminal in the related art.

As described above, when a breakdown is generated in the construction equipment in the related art, other information, except for the fact that the breakdown is generated, is not notified, so that it cannot exclude a probability that high-price equipment is broken or a safety accident is generated during the continuous operation of a vehicle, and thus an operation itself of the construction equipment is abandoned. All of the work are stopped due to the breakdown of the construction equipment as described above, so that temporal and financial damages are generated in a field.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure is conceived in order to solve one or more of the aforementioned problems, and an object of an exemplary embodiment of the present disclosure is to provide a breakdown management method of construction machinery, which is capable of analyzing breakdown information when a problem is generated in construction equipment, and notifying currently operable work.

Further, another object of some exemplary embodiments of the present disclosure is to provide a breakdown management method, which is capable of making operable work be continued until an A/S engineer or an equipment manager arrives even while a problem is generated in the construction equipment, thereby minimizing temporal and financial damages incurred when all of work are stopped due to a breakdown of the construction equipment.

To this end, a method of managing a breakdown of construction equipment according to an exemplary embodiment of the present disclosure includes: requesting, by a diagnosis device of the construction equipment, state information from a plurality of vehicle control devices; confirming, by the diagnosis device, the state information received from the plurality of vehicle control devices; transmitting, by the diagnosis device, breakdown information to a peripheral communication terminal or a control server when the plurality of vehicle control devices has a problem according to the state information; receiving, by the diagnosis device, a breakdown part and a current workable range of the construction equipment from the communication terminal or the control server; and displaying the breakdown part and the current workable range of the construction equipment on a gauge panel.

Further, a diagnosis device of construction equipment according to an exemplary embodiment of the present disclosure includes: a CAN interface configured to perform CAN communication with a plurality of vehicle control devices; a communication module configured to transmit state information on the plurality of vehicle control devices to a peripheral communication terminal or a control server; a memory configured to store the state information received from the plurality of vehicle control devices; and a controller configured to request the state information from the plurality of vehicle control devices, and transmit breakdown information to the communication terminal or the control server through the communication module when the plurality of vehicle control devices has a problem according to the state information, and in which the controller receives data including a breakdown part and a current workable range of the construction equipment through the communication module from the peripheral communication terminal or the control server, transmits the received data on a gauge panel through the CAN interface, and displays the received data on the gauge panel.

As described above, the present disclosure has an effect in that a driver and an equipment manager may recognize a breakdown part and a current workable range of construction equipment when a problem is generated in the construction equipment.

Further, according to the present disclosure, since a current workable range is guided when a problem is generated in the construction equipment, it is possible to continuously perform work within the guided work range without the necessity to stop all of work according to a breakdown of the construction equipment, thereby preventing temporal and financial loss according to the stop of the work.

Meanwhile, an effect of the present disclosure is not limited to the aforementioned matters, and those skilled in the art will clearly understand non-mentioned other objects through the following description.

DETAILED DESCRIPTION

Hereinafter, an exemplary embodiment of the present disclosure will be described in detail with reference to the accompanying drawings. Particular and specific matters described below are provided for helping general understanding of the present disclosure. In the following description of the exemplary embodiment, a detailed description of known configurations or functions incorporated herein will be omitted when it is determined that the detailed description may unnecessarily make the subject matter of the present disclosure unclear.

Figure 1:
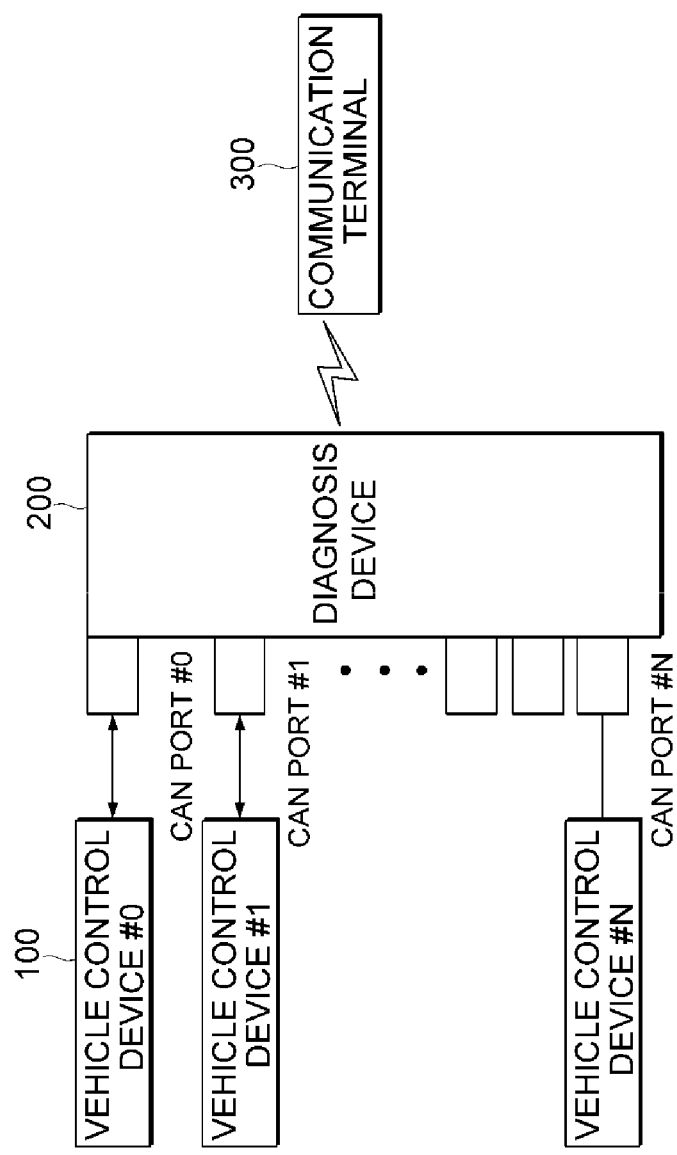
FIG. 1 is a schematic configuration diagram illustrating a breakdown management system of construction equipment according to an embodiment of the present disclosure.

FIG. 1 illustrates a schematic configuration of a breakdown management system of construction equipment according to an embodiment of the present disclosure.

Referring to FIG. 1, a breakdown management system of construction equipment includes a plurality of vehicle control devices 100, a diagnosis device 200 connected with the plurality of vehicle control devices 100, a communication terminal 300 connected with the diagnosis device 200 through near field communication, and the like.

The vehicle control device 100 is a device mounted in each part of the construction equipment to control an operation and a movement, and electronically control various areas of a vehicle up to a safety device and a device for convenience, as well as core areas in vehicle driving, such as an engine driving device, a brake device, and a steering device. The vehicle control devices 100 communicate with each other by internally using a protocol called a controller area network (CAN), and are connected with the diagnosis device 200 through CAN communication.

The diagnosis device 200 includes a plurality of CAN ports #0 to #N to be connected with the plurality of vehicle control devices 100, and receives state information on the vehicle control devices 100 from the vehicle control devices 100. Further, the diagnosis device 200 is connected with the peripheral communication terminal 300 through the near field communication, and transmits stored state information to the communication terminal 300. The diagnosis device 200 has a problem code value of each vehicle control device 100, so that the diagnosis device 200 may recognize whether the vehicle control devices 100 have a problem by comparing the state information on the vehicle control device 100 and the problem code value.

The diagnosis device 200 according to the present disclosure stores the state information in a memory, and transmits breakdown information to the peripheral communication terminal 300 connected through the near field communication when the vehicle control device has a problem according to the state information. The diagnosis device 200 receives a current workable range together with a breakdown part of the construction equipment from the communication terminal 300.

The communication terminal 300 is connected with the diagnosis device 200 through the near field communication, such as Bluetooth or Wi-Fi, to receive the breakdown information on the construction equipment from the diagnosis device 200. The communication terminal 300 analyzes the breakdown information received from the diagnosis device 200, and transmits the breakdown part and the current workable range of the construction equipment to the diagnosis device 200.

The communication terminal 300 may include a smart phone, a tablet PC, a notebook computer, and the like, but any type of device, in which an application capable of receiving breakdown information through the near field communication, and analyzing and processing the breakdown information may be installed, may be used.

Figure 2:
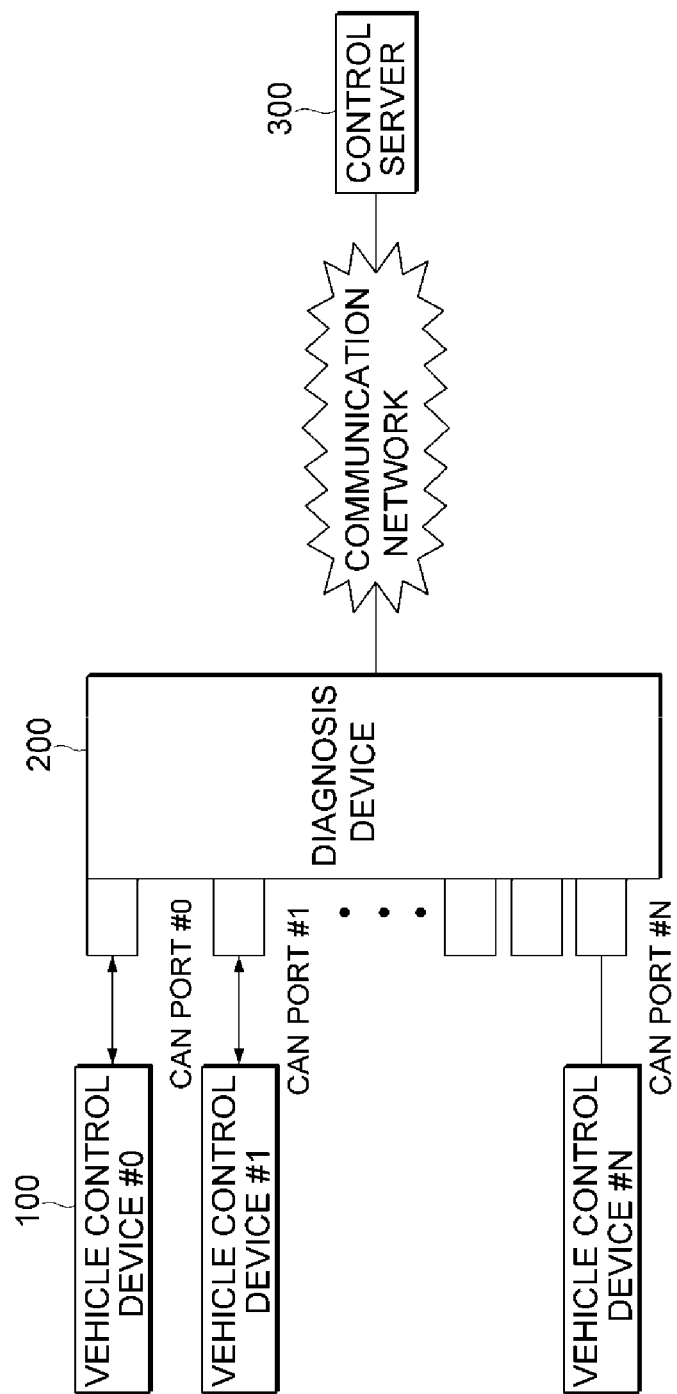
FIG. 2 is a schematic configuration diagram illustrating a breakdown management system of construction equipment according to another embodiment of the present disclosure.

FIG. 2 illustrates a schematic configuration of a breakdown management system of construction equipment according to another embodiment of the present disclosure.

A breakdown management system of construction equipment of FIG. 2 is the same as that of FIG. 1 except for a feature that a control server 400 receives and analyzes breakdown information instead of a communication terminal 300. Description of parts of FIG. 2, which are the same as those of FIG. 1, will be omitted.

The control server 400 is connected with a diagnosis device 200 through a satellite communication network to store and analyze breakdown information received from the diagnosis device 200. The control server 400 analyzes the breakdown information and provides the diagnosis device 200 with data including a breakdown part and a current workable range of the construction equipment.

Figure 3:
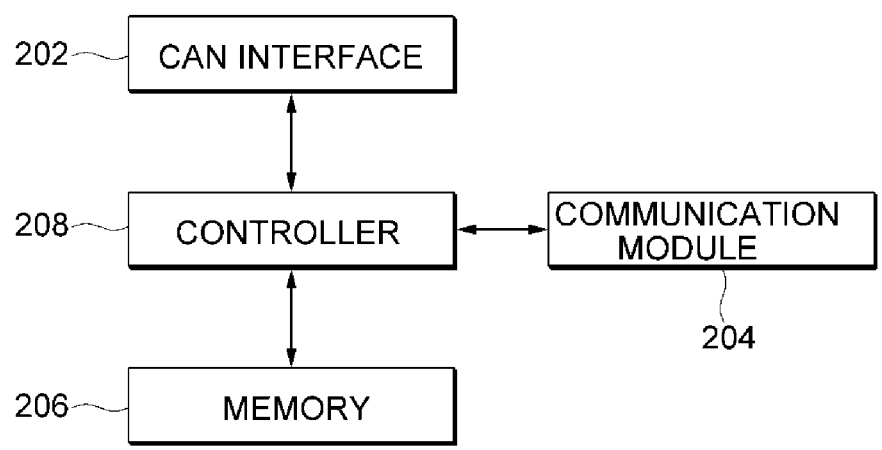
FIG. 3 is an internal configuration diagram of a diagnosis device according to an exemplary embodiment of the present disclosure.

FIG. 3 is an internal configuration diagram of the diagnosis device according to the exemplary embodiment of the present disclosure.

Referring to FIG. 3, the diagnosis device 200 includes a CAN interface 202, a communication module 204, a memory 206, a controller 208, and the like.

The CAN interface 202 processes state information received from the plurality of vehicle control devices 100 through the CAN communication and transmits the processed state information to the controller 208.

The communication module 204 may be a Bluetooth or Wi-Fi communication module connected with the peripheral communication terminal 300 through the near field communication to transmit the breakdown information to the communication terminal 300 through the near field communication, or a mobile communication module or a satellite communication module capable of transmitting the breakdown information to the control server 300 through a mobile communication network or a satellite communication network. The diagnosis device of the construction equipment generally includes a satellite communication module to be connected with the control server through a satellite communication network.

The memory 206 stores the state information received from the vehicle control device 100, and stores a problem code value based on which it is possible to know whether the vehicle control device 100 has a problem.

A controller 208 serves to control each part of the diagnosis device 200. The controller 208 periodically requests the state information from the plurality of vehicle control devices 100 to receive the state information. The controller 208 compares the state information received from the vehicle control device 100 with the problem code value stored in the memory 206, and determines whether the vehicle control device 200 has a problem according to the state information.

When the state information is breakdown information as a result of determination on whether the problem is included in the state information, the controller 208 checks a current communication state and transmits the breakdown information to the communication terminal through the near field communication, or transmits the breakdown information to the control server through the satellite communication network and the like.

Figure 4:
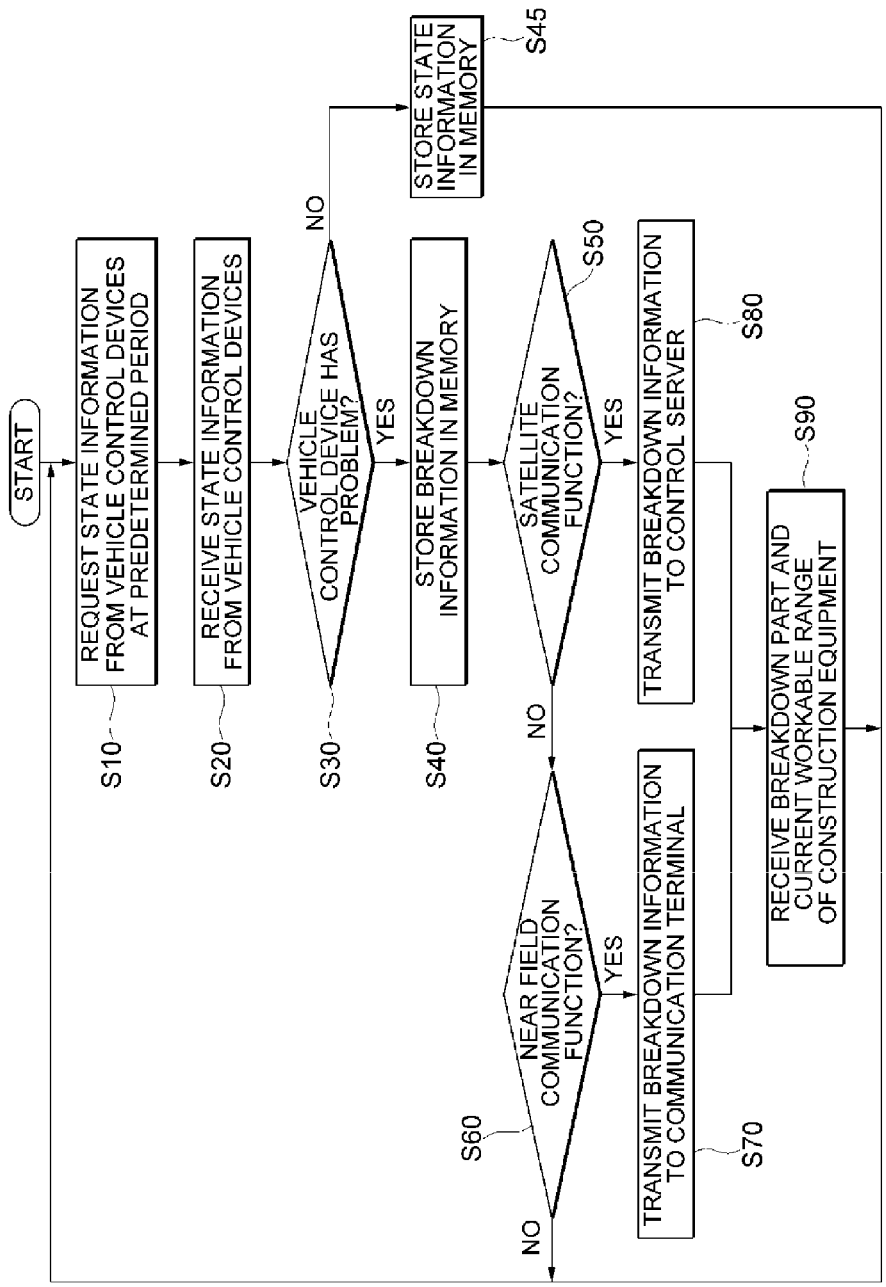
FIG. 4 is a flowchart illustrating a breakdown management method of construction equipment according to an exemplary embodiment of the present disclosure.

FIG. 4 is a flowchart illustrating a breakdown management method of construction equipment according to an exemplary embodiment of the present disclosure.

Referring to FIG. 4, the diagnosis device 200 first requests state information from the vehicle control device 100 for every predetermined period of time (S10).

The diagnosis device 200 receives the state information from the vehicle control device 100 through the CAN communication (S20), and determines whether the vehicle control device 100 has a breakdown (S30).

When the vehicle control device 100 does not have a breakdown according to the state information, the diagnosis device 200 stores the corresponding state information in an internal memory 206 (S45). When the breakdown is generated according to the state information, the diagnosis device 200 stores the breakdown information, which is the corresponding state information, in the internal memory 206 (S40), and then checks a current communication state.

When the diagnosis device 200 includes the satellite communication module and is currently connectable to the satellite communication network (S50), the diagnosis device 200 transmits the breakdown information to the control server 400 (S80). In the meantime, when the diagnosis device 200 includes the near field communication module, such as Bluetooth or Wi-Fi, and may establish near field communication with the current peripheral communication terminal (S60), the diagnosis device 200 transmits the breakdown information to the communication terminal 300 connected through the near field communication (S70).

When the communication terminal 300 receives the breakdown information from the diagnosis device 200, the communication terminal 300 analyzes the breakdown information by executing an application installed in the internal memory. Further, when the control server 400 receives the breakdown information from the diagnosis device 200, the control server 400 also analyzes the breakdown information.

The communication terminal 300 or the control server 400 recognizes a breakdown part and a current workable range of the construction equipment based on a result of the analysis of the breakdown information, and transmits the recognized breakdown part and current workable range to the diagnosis device 200. The diagnosis device 200 receives the breakdown part and the current workable range of the construction equipment (S90), and transmits a gauge panel (not illustrated) of the construction equipment.

The gauge panel of the construction equipment displays the breakdown part and the current workable range of the construction equipment, and enables a driver to recognize currently operable work.

For example, when it is determined that a problem is generated in a swing device part as a result of the analysis of the breakdown, the communication terminal or the control server may notify a driver that excavation and travelling, except for a swing operation, are available. Then, the driver may continuously perform excavation or travelling until an A/S engineer or an equipment manager arrives.

Further, when it is determined that a breakdown is generated in a transmission control unit (TCU) of a wheel loader, the communication terminal or the control server may notify a driver that general loading and delivering operations, except for a transmission operation, AEB (autonomous emergency braking) performance, selection of a TCU program, and the like, are available.

The exemplary embodiments of the present disclosure have been described with reference to the accompanying drawings, but those skilled in the art will understand that the present disclosure may be implemented in another specific form without changing the technical spirit or an essential feature thereof.

Therefore, these above-described embodiments are provided or full understanding of the scope of the present disclosure by those skilled in the art, so that it should be understood that the present disclosure is only for illustrative purposes in all aspects and is not limited, and is only defined by the accompanying claims.

The breakdown management method of construction equipment, which provides current workable information, exceeds a technical limit in the related art in that the breakdown management method may continuously perform work within a guided work range without the necessity to stop all of work according to the breakdown of the construction equipment by analyzing breakdown information when a problem is generated in construction equipment and notifying current workable information, as well as a breakdown part of the construction equipment, so that it is possible to prevent temporal and financial loss according to the stop of the work, and thus the breakdown management method is realistically and clearly carried out, as well as the relevant technology is used, and an applied device is commercially available or is available in business, thereby being industrially applicable.

The invention claimed is:

1. A method of managing a breakdown of construction equipment, comprising:
   requesting, by a diagnosis device of the construction equipment, state information from a plurality of vehicle control devices;
   confirming, by the diagnosis device, state information received from the plurality of vehicle control devices;
   transmitting, by the diagnosis device, breakdown information to a peripheral communication terminal or a control server when at least one of the plurality of vehicle control devices has a problem according to the state information;
   receiving, by the diagnosis device, a breakdown part and a current workable range of the construction equipment based on a result of an analysis of the breakdown information from the communication terminal or the control server, the current workable range of the construction equipment including at least one of a swing operation, an excavation operation, a travelling operation, a loading operation, a delivering operation, and a transmission operation; and
   displaying the breakdown part and the current workable range of the construction equipment on a gauge panel, wherein the current workable range is a list of one or more available operations of the construction equipment having the breakdown part.

2. A method of managing a breakdown of construction equipment, comprising:
   requesting, by a diagnosis device of the construction equipment, state information from a plurality of vehicle control devices;
   confirming, by the diagnosis device, the state information received from the plurality of vehicle control devices;
   transmitting, by the diagnosis device, breakdown information to a peripheral communication terminal or a control server when at least one of the plurality of vehicle control devices has a problem according to the state information;
   analyzing, by the communication terminal or the control server, the breakdown information; and
   displaying, by the communication terminal or the control server, an analysis result of the breakdown information and a current workable range of the construction equipment based on a result of the analysis of the breakdown information and a function on a screen of the communication terminal, the current workable range of the construction equipment including at least one of a swing operation, an excavation operation, a travelling operation, a loading operation, a delivering operation, and a transmission operation,
   wherein the current workable range is a list of one or more available operations of the construction equipment having the breakdown part.

3. A diagnosis device of construction equipment, comprising:
   a CAN bus configured to allow CAN communications between a plurality of vehicle control devices and a microcontroller;
   a communications interface configured to transmit state information of at least one of the plurality of vehicle control devices to a peripheral communication terminal or a control server;
   a memory device configured to store the state information received from the plurality of vehicle control devices; and
   the microcontroller configured to:
      request the state information from the plurality of vehicle control devices;
      transmit breakdown information to the communication terminal or the control server through the communications interface when at least one of the plurality of vehicle control devices has a problem according to the state information;
      receive data including a breakdown part and a current workable range of the construction equipment based on a result of analysis of the breakdown information through the communications interface from the peripheral communication terminal or the control server, the current workable range of the construction equipment including at least one of a swing operation, an excavation operation, a travelling operation, a loading operation, a delivering operation, and a transmission operation; and
      transmit the received data to a gauge panel through the CAN bus,
   wherein the gauge panel displays the received data, and
   wherein the current workable range is a list of one or more available operations of the construction equipment having the breakdown part.

* * * * *